I. W. NONNEMAN.
WORK HOLDER FOR PIPE THREADING TOOLS.
APPLICATION FILED AUG. 9, 1909.
953,971. Patented Apr. 5, 1910.
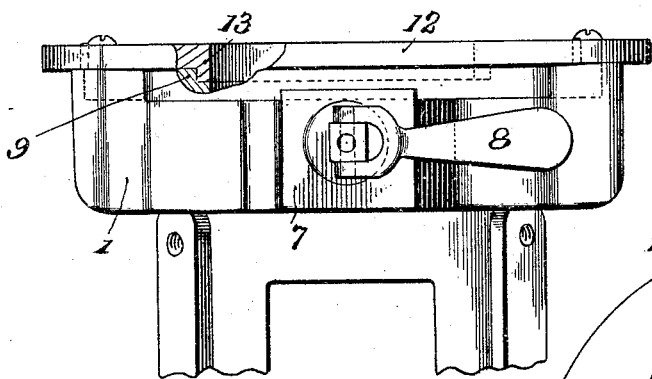
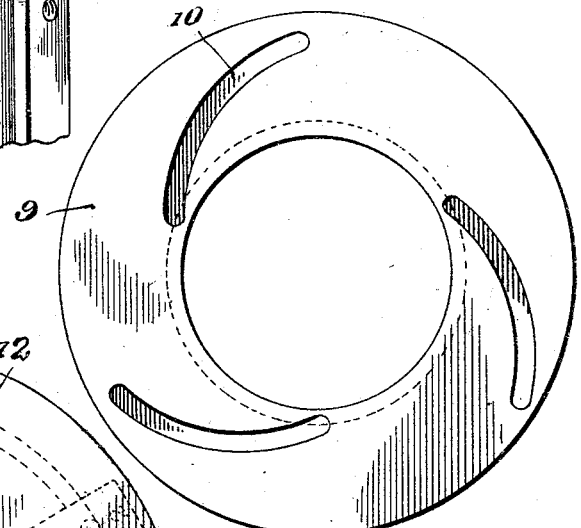
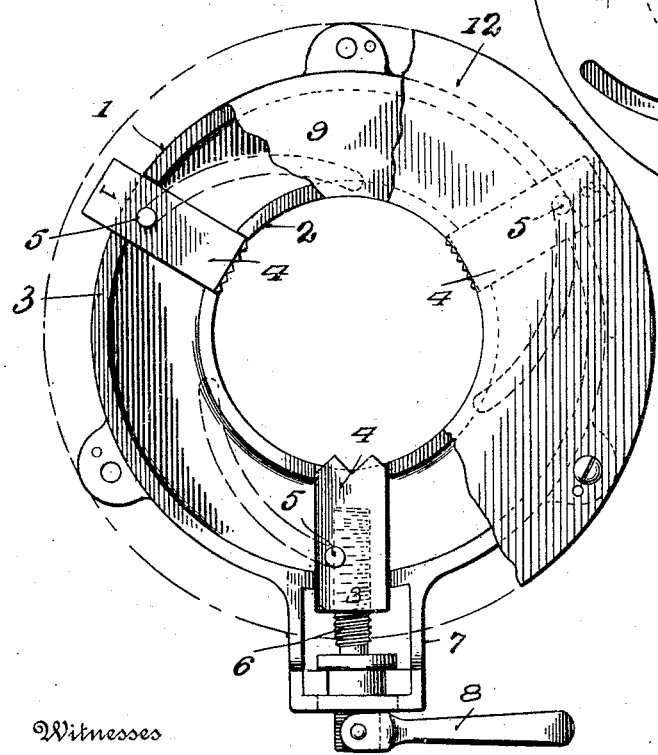
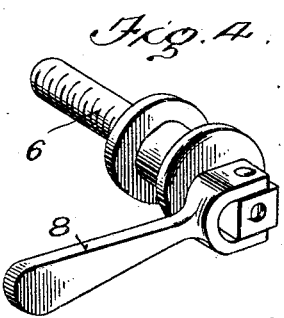

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

WORK-HOLDER FOR PIPE-THREADING TOOLS.

953,971.    Specification of Letters Patent.    Patented Apr. 5, 1910.

Application filed August 9, 1909. Serial No. 511,977.

*To all whom it may concern:*

Be it known that I, IRA W. NONNEMAN, of Warren, in the county of Trumbull and State of Ohio, have invented certain new and useful Improvements in Work-Holders for Pipe-Threading Tools; and I do hereby declare the following to be a full, clear, and exact description of the invention, such as will enable others skilled in the art to which it appertains to make and use the same.

The primary object of this invention is to provide improved means for accurately and securely centering pipes of various sizes within the capacity of a pipe threading tool. And a further object is to effect by improved and highly efficient means the simultaneous adjustment of a plurality of pipe-engaging members by the manipulation of a single member.

The invention will be hereinafter fully set forth and particularly pointed out in the claims.

In the accompanying drawings, Figure 1 is a view in side elevation. Fig. 2 is an end elevation with parts broken away. Fig. 3 is an inner face view of the cam plate. Fig. 4 is a view of the adjusting screw detached.

Referring to the drawings, 1 designates the housing of a work holder of a pipe threading tool, which housing has a series of radial guideways which in the present instance are shown as being formed by cutting away opposite portions of inner and outer concentric flanges 2 and 3. Within these guideways fit pipe-engaging members 4 which are shown as approximately square in cross section and roughened or pointed on their inner ends to prevent slipping and insure firm engagement with pipes upon which the tool is being centered. Each of these members has an outwardly projecting lug 5, and in one member works a screw 6 which is held as against moving longitudinally by its bearing 7 which projects from the periphery of the housing. To the outer end of this screw is pivoted a handle 8 by turning which the pipe-engaging member in which the screw works may be moved inward or outward.

For the purpose of effecting the simultaneous adjustment of all the pipe-engaging members through the longitudinal movement of the screw-actuated member, I provide a rotatable circular plate 9 which on its inner face has a series of eccentric grooves 10 which take in the lugs of the several pipe-engaging members. This plate has a central opening, and is shown as being held to the outer face of the housing by a retaining plate 12, which latter has a circular flange 13 around its central opening which fits in a recess surrounding the opening of cam plate 9. This latter plate is shown as corresponding in diameter to that of the housing, while the retaining plate is shown as slightly larger and as being held by screws 14 to posts 15 of the housing. The flange 13 of the retaining plate insures the accurate centering of the cam plate and prevents any binding of the latter by reason of the end thrust occasioned by turning the screw. In consequence when such screw is turned, causing its respective pipe-engaging member to travel either inward or outward, the cam plate is forced to rotate axially by reason of the engagement of the lug of such member with the wall of its respective eccentric groove. This turning of the cam plate will cause the simultaneous adjustment of the remaining pipe-engaging members, all of which move in unison. Thus it will be seen that by adjusting the screw centered in one pipe-engaging member the cam plate will be caused to rotate and effect the uniform adjustment of the remaining members. In this way all of the members will engage a pipe simultaneously and under uniform pressure.

A work-holder thus constructed is simple in operation, strong and durable, and its use greatly facilitates the centering of a pipe threading tool on pipes to be threaded.

I claim as my invention:—

1. A work holder for pipe threading tools comprising a housing having a series of radial guideways, a series of pipe clamping members fitted in such guideways, a plate rotatably mounted on said housing and having interlocking engagement with said members to effect the longitudinal movement thereof by the axial turning of such plate, a screw mounted in said housing and engaging one of said members for moving it inward or outward to effect the axial rotation of such plate and the simultaneous adjustment of the remaining members, and a retaining plate mounted on said housing and having a bearing for said former plate.

2. A work holder for pipe threading tools comprising a housing having a series of radial guideways, a series of pipe clamping members fitted in said guideways, each of said members having a lug, a plate rotatably mounted on said housing and having a series of eccentric grooves for taking in said lugs, a screw working in one of said members and having its bearing in said housing, and a retaining plate secured to said housing having a central circular flange with which said former plate engages.

In testimony whereof, I have signed this specification in the presence of two subscribing witnesses.

IRA W. NONNEMAN.

Witnesses:
J. B. PHILLIPS,
A. J. SUTCLIFFE.